*US008941610B1*

United States Patent
Rivera et al.

(10) Patent No.: US 8,941,610 B1
(45) Date of Patent: Jan. 27, 2015

(54) CAPACITIVELY COUPLED COMPUTING DEVICE ANTENNA

(75) Inventors: Felix Alvarez Rivera, San Jose, CA (US); Ajay Gummalla, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 162 days.

(21) Appl. No.: 13/600,427

(22) Filed: Aug. 31, 2012

(51) Int. Cl.
*G06F 3/041* (2006.01)

(52) U.S. Cl.
USPC .......................................... 345/173; 343/702

(58) Field of Classification Search
None
See application file for complete search history.

(56) References Cited

U.S. PATENT DOCUMENTS

| 7,113,175 | B2 | 9/2006 | Liu et al. | |
|---|---|---|---|---|
| 7,928,965 | B2 | 4/2011 | Rosenblatt et al. | |
| 8,264,412 | B2 * | 9/2012 | Ayala et al. | 343/702 |
| 8,577,289 | B2 * | 11/2013 | Schlub et al. | 455/41.1 |
| 2008/0150905 | A1 * | 6/2008 | Grivna et al. | 345/173 |
| 2010/0321325 | A1 | 12/2010 | Springer et al. | |
| 2011/0151937 | A1 | 6/2011 | Kusuda et al. | |
| 2011/0273382 | A1 * | 11/2011 | Yoo et al. | 345/173 |
| 2011/0298670 | A1 * | 12/2011 | Jung et al. | 343/702 |
| 2014/0043248 | A1 * | 2/2014 | Yeh et al. | 345/173 |

* cited by examiner

*Primary Examiner* — Jonathan Boyd
*Assistant Examiner* — Sardis Azongha
(74) *Attorney, Agent, or Firm* — Lerner, David, Littenberg, Krumholz & Mentlik, LLP

(57) ABSTRACT

A computing device includes a capacitively coupled antenna provided in a display portion of the device. An antenna pattern is provided on a backside of a touch screen display. An antenna element is provided in a display housing. The touch screen is attached to the display housing a dielectric adhesive. The dielectric adhesive prevents the antenna pattern from contacting the antenna element such that the antenna pattern is capacitively coupled to the antenna element.

21 Claims, 6 Drawing Sheets

CAPACITIVELY COUPLED COMPUTING DEVICE ANTENNA

BACKGROUND

The disclosure relates generally to a capacitively coupled antenna provided in a computing device.

Computing devices communicate wirelessly with a network by means of an antenna. As computing devices become smaller, the area that is available for antennas decreases. In computing devices with touch screen displays, the antenna is commonly provided underneath a bezel along an edge of the display. The volume occupied by the computing device may be reduced by removing the bezel and extending the touch screen to the edges of the device. By removing the bezel, the space available for the antenna is further reduced which may also adversely affect antenna performance.

SUMMARY

Aspects of the disclosure are directed to a capacitively coupled antenna provided in a computing device. The antenna includes an antenna pattern provided on a backside of a touch screen display and an antenna element provided in a display housing. The touch screen display is attached to the display housing a dielectric adhesive. The dielectric adhesive prevents the antenna pattern from contacting the antenna element such that the antenna pattern is capacitively coupled to the antenna element. The properties and thickness of the dielectric adhesive determine the strength of the capacitively coupled antenna. Accordingly, antenna performance may be improved while also promoting a reduced volume of the computing device.

In some aspects, a computing device includes a touch screen display having an antenna pattern provided on a surface thereof and a display housing having an antenna element provided therein. The touch screen display is attached to the display housing a dielectric adhesive. The dielectric adhesive is provided between the antenna pattern and the antenna element. The dielectric adhesive prevents the antenna pattern from contacting the antenna element such that the antenna pattern is capacitively coupled to the antenna element.

In some aspects, a computing device includes a base portion and a display portion attached to the base portion. The display portion includes a touch screen display having an antenna pattern provided on a surface thereof and a display housing having an antenna element provided therein. The touch screen display is attached to the display housing a dielectric adhesive. The dielectric adhesive is provided between the antenna pattern and the antenna element. The dielectric adhesive prevents the antenna pattern from contacting the antenna element such that the antenna pattern is capacitively coupled to the antenna element.

In some aspects, a method includes providing an antenna pattern on a surface of a touch screen display. An antenna element is provided in a display housing. The touch screen display is attached to the display housing a dielectric adhesive. The dielectric adhesive is provided between the antenna pattern and the antenna element, and prevents the antenna pattern from contacting the antenna element such that the antenna pattern is capacitively coupled to the antenna element.

DETAILED DESCRIPTION

The aspects, features and advantages of the present disclosure will be appreciated when considered with reference to the following description of preferred implementations and accompanying figures. The following description does not limit the disclosure; rather, the scope is defined by the appended claims and equivalents.

While certain processes in accordance with example implementations are shown in the figures as occurring in a linear fashion, this is not a requirement unless expressly stated herein. Different processes may be performed in a different order or concurrently.

The disclosure describes a computing device having a capacitively coupled antenna. The computing device includes a touch screen display that substantially extends to edges of the device. An antenna pattern is provided on a backside of the touch screen using known metal sputtering techniques or equivalents. An antenna element is provided in a display housing of the device. The touch screen is attached to the display housing a dielectric adhesive. The dielectric adhesive prevents the antenna pattern from contacting the antenna element such that the antenna pattern is capacitively coupled to the antenna element. The properties and thickness of the dielectric adhesive determines the strength of the capacitively coupled antenna. Accordingly, antenna performance may be improved while also promoting a reduced volume of the computing device.

Figure 1:
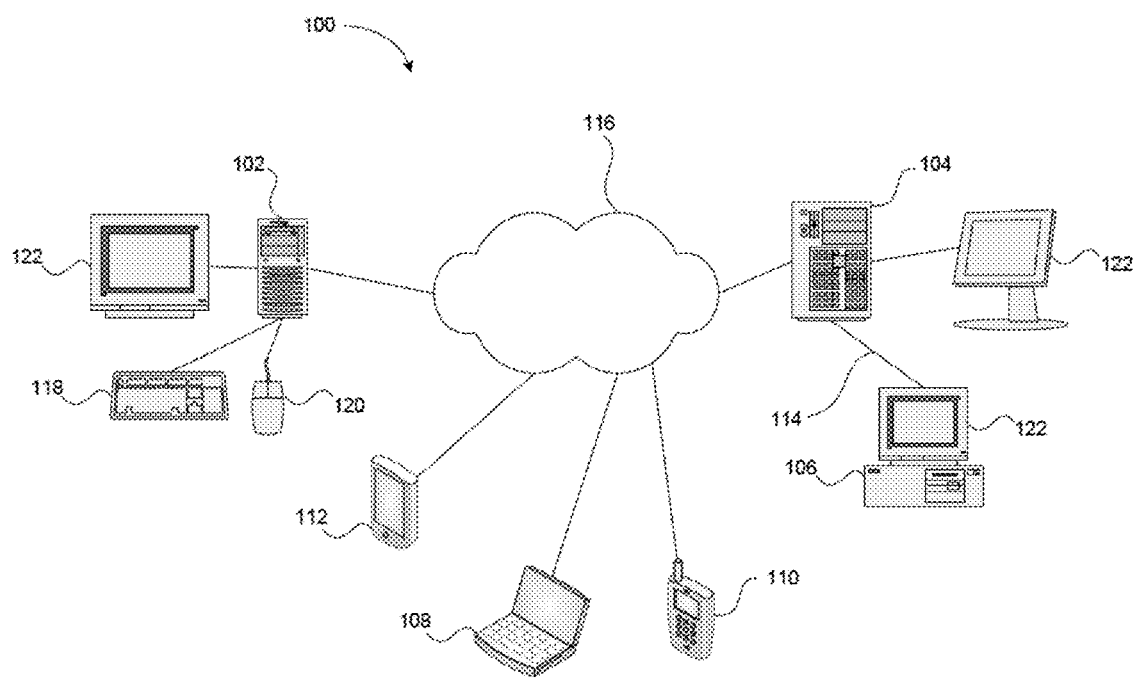
FIG. 1 illustrates a system in accordance with example implementations.

FIG. 1 illustrates various computing devices that can be used alone or in a networked configuration in accordance with aspects of the disclosure. For example, FIG. 1 illustrates a network environment 100 having a plurality of computers 102, 104, 106, 108 as well as other types of devices such as a mobile phone 110 and a tablet computer 112. Such devices may be interconnected using a local or direct connection 114 and/or may be coupled using a network 116 such as a LAN, WAN, the Internet, etc., which may be wired or wireless.

Each device may include, for example, one or more processing devices and have user inputs such as a keyboard 118 and mouse 120 and/or various other types of input devices such as pen-inputs, joysticks, buttons, touch screens, etc., as well as a display 122, which could include, for instance, a CRT, LCD, plasma screen monitor, TV, projector, etc. Each computer 102, 104, 106, 108 may be a personal computer, server, etc. By way of example only, computers 102, 106 may be personal computers while computer 104 may be a server and computer 108 may be a laptop.

Figure 2:
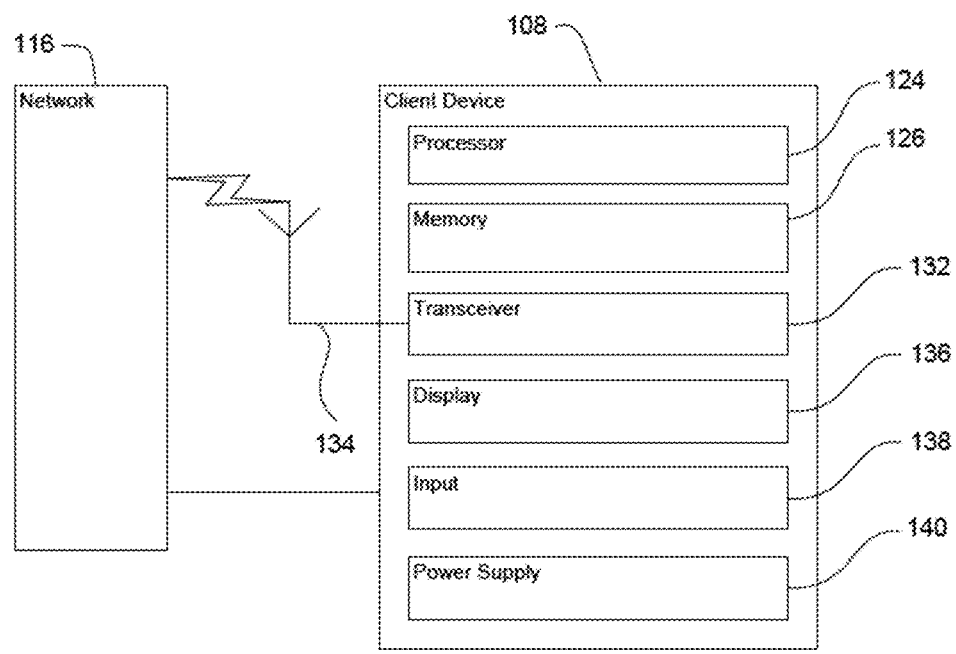
FIG. 2 illustrates aspects of the system of FIG. 1.

As shown in FIG. 2, each computer, such as client device 108, contains a processor 124, memory/storage 126 and other components typically present in a computer. For instance, memory/storage 126 stores information accessible by processor 124. The client device 108 may be a mobile computing device capable of wirelessly exchanging data. By way of example only, client device 108 may be a wireless-enabled tablet computer, laptop computer or a cellular phone capable of obtaining information via the Internet. The client device 108 may also include a transceiver 132 coupled to an antenna 134. The transceiver 132 includes a transmitter and a receiver for wirelessly communicating with network 116 via the antenna 134.

The client device 108 may include an electronic touch screen display 136 and user input 138 (e.g., a mouse, keyboard or microphone). The user input 138 may be included as part of the touch screen display 136. The client device 108 may also include an accelerometer, speakers, a network interface device, a battery power supply 140 or other power source, and all of the components used for connecting these elements to one another.

Figure 3:
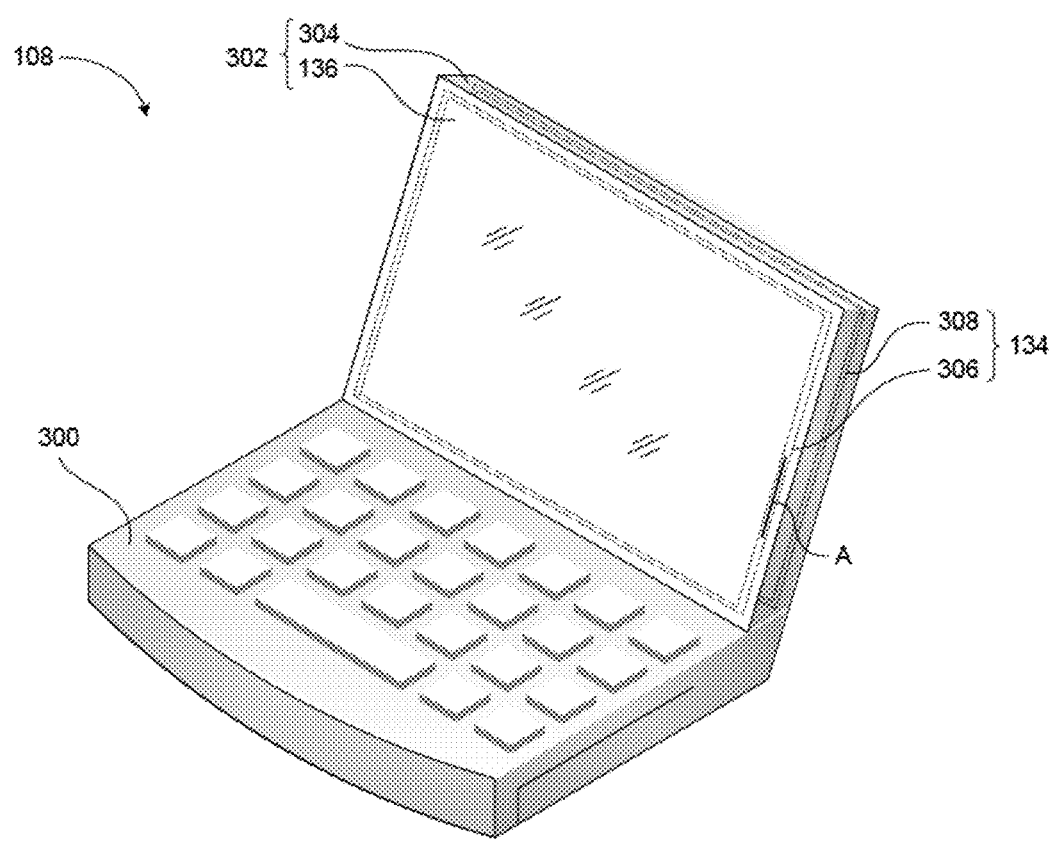
FIG. 3 illustrates a computing device having a capacitively coupled antenna.

FIG. 3 illustrates an example of a laptop computing device; however, this disclosure applies to any mobile computing device such as a tablet computer, a PDA or a cellular phone. In this example, the computing device 108 is provided with a base portion 300 and a display portion 302 coupled to the base portion by a hinge (not shown). The display portion 302 includes the touch screen display 136 and a display housing 304. The display housing 304 may be made of metal or other rigid material.

The touch screen 136 is an electronic visual display that can detect the presence and location of a touch by a finger or hand within the display area. The touch screen 136 can also sense other objects such as a stylus. The touch screen 136 enables one to interact directly with what is displayed, rather than indirectly with a pointer controlled by a mouse or touchpad. The touch screen 136 is provided on the display portion 302 such that edges of the touch screen 136 are essentially flush with edges of the display housing 304.

The antenna 134 is provided within the display portion 302. The antenna 134 includes an antenna pattern 306 provided on a back side of the touch screen 136 and an antenna element 308 provided within the display housing 304. Both the antenna pattern 306 and the antenna element 308 are illustrated with dotted lines to indicate that the antenna 134 is embedded within the computing device below an outer surface thereof.

The antenna pattern 134 may be provided on the touch screen 136 using known masking/sputtering techniques. In one example, the antenna pattern 134 is provided on a back side of the touch screen 136 by patterning indium tin oxide (ITO) or molybdenum on the touch screen. Such a technique can provide the antenna pattern 306 on the touch screen 136 in a fine pattern with a thickness of less than 0.1 mm.

The antenna element 308 is commonly provided in computing devices designed to communicate wirelessly over a network. When the display portion 302 is assembled, the antenna pattern 306 is capacitively coupled to the antenna element 308 such that the performance of the antenna 134 is enhanced while also reducing the volume of the laptop 108, as described in detail below. Accordingly, the disclosure leverages an existing feature of the computing device to improve antenna performance. By utilizing existing computing device components, the volume of the computing device need not be increased by the addition of a capacitively coupled antenna 134.

Figure 4:
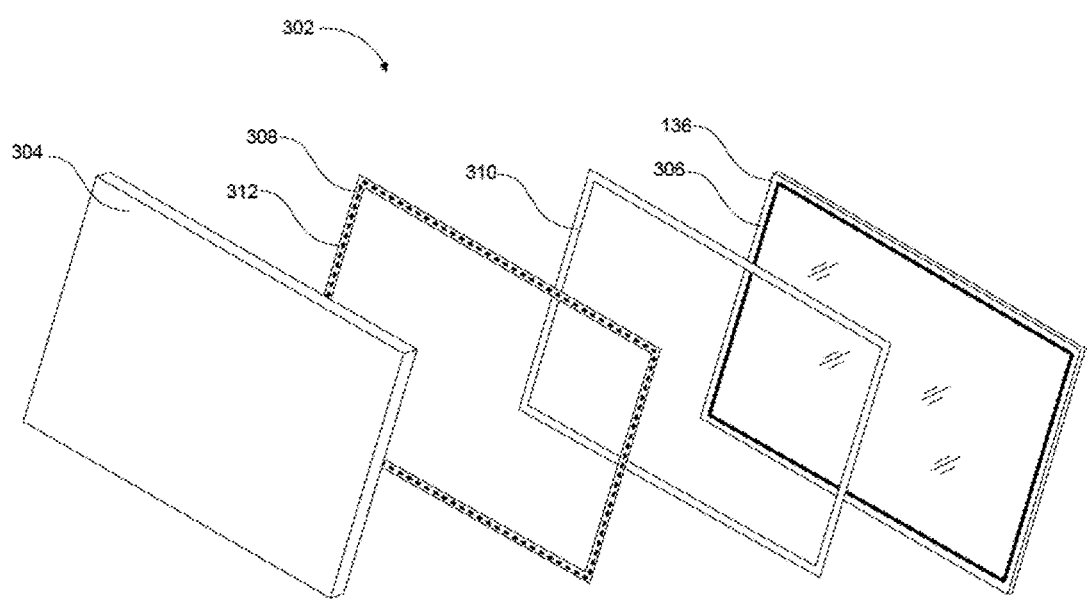
FIG. 4 illustrates an exploded view of a display portion of the computing device.

FIG. 4 illustrates an exploded view of the display portion 302 of the computing device 108. The display portion 302 includes the touch screen 136 with the antenna pattern 306 provided on a back side of the touch screen 136 using well-known masking/sputtering techniques. The display portion 302 also includes the display housing 304 with the antenna element 308 provided within the display housing 304.

The antenna element 308 may be provided in an antenna carrier 312 in the display housing 304. The antenna element 308 is illustrated using a dotted line in FIG. 4 to indicate that the antenna carrier 312 is provided between the display housing 304 and the antenna element 308. The antenna element 308 is exposed on the side of the antenna carrier 312 facing the touch screen 136. The antenna carrier 312 may shield the antenna element 308 from interfering with the other components of the computing device 108 in the display housing 304. In some cases, the antenna carrier 312 may also shield the antenna element 308 from interference caused by the display housing 304 when the display housing 304 is made of metal.

The shape of the antenna pattern 306 matches the shape of the antenna element 308 such that the when the display portion 302 is assembled, the antenna pattern 306 and the antenna element 308 are substantially aligned. In FIG. 4, the antenna pattern 306 and the antenna element 308 are rectangular and are provided proximate edges of the touch screen 136 and the display housing 304, respectively. However, the antenna 134 may be shaped in other configurations as long as the antenna pattern 306 and the antenna element 308 are substantially aligned.

To assemble the display portion 302, a dielectric adhesive 310 is used to affix the touch screen 136 to the display housing 304. The dielectric adhesive 310 is provided between the antenna pattern 306 and the antenna element 308 such that the antenna pattern 306 does not directly contact the antenna element 308. As a result, the antenna pattern 306 is capacitively coupled to the antenna element 308. By providing the antenna pattern 306 in close proximity to the antenna element 304, antenna 134 performance is improved and the overall volume of the laptop 108 is reduced.

Figure 5:
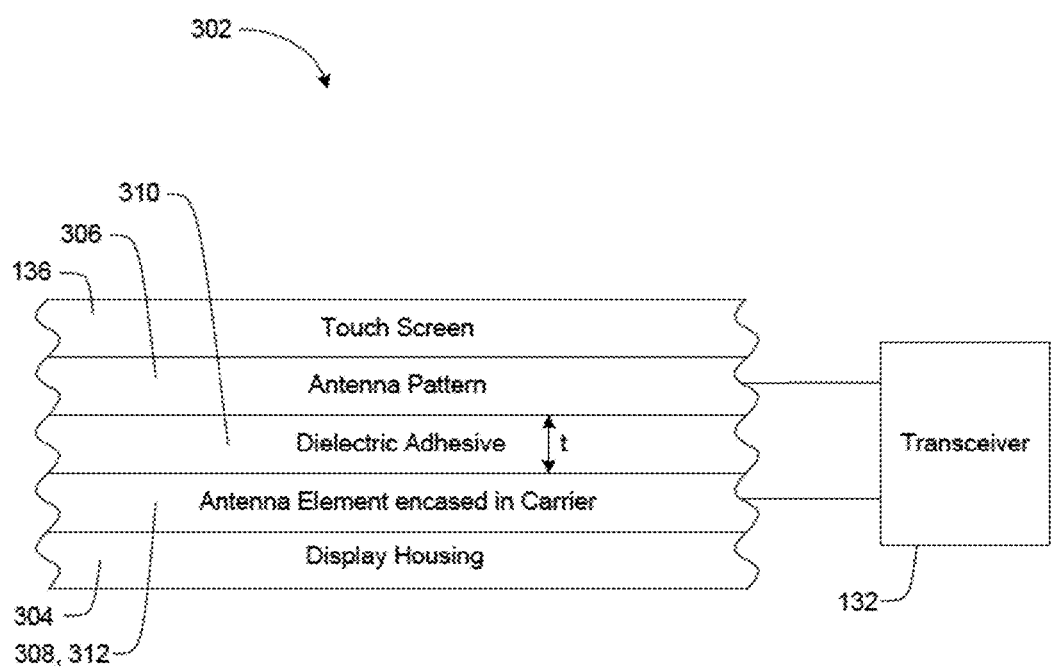
FIG. 5 illustrates a cross-sectional view of the display portion of the computing device.

FIG. 5 illustrates a cross sectional view of the display portion 302 of the laptop 108 taken along line A of FIG. 3. The display portion 302 includes the antenna pattern 306 provided on the touch screen 136. The antenna element 308 is encased in the antenna carrier 312 provided within the display housing 304.

The dielectric adhesive 310 provides a gap between the antenna pattern 306 and the antenna element 308. The thickness (t) of the gap can be selected by determining the amount of dielectric adhesive 310 that is used to attach the touch screen 136 to the display housing 304. The thickness (t) of the gap and the properties of the dielectric adhesive 310, combined with the layout of antenna pattern 306 and the antenna element 308, determines the capacitive coupling strength of the antenna 134. The antenna pattern 306 and the antenna element 308 are coupled to the transceiver 132, which receives/transmits signals via the antenna 134.

The reduced size of computing devices may increase overall capacitive coupling between electronic components of the device. Typically, capacitive coupling is avoided to prevent interference between device components. However, as described above, the disclosure adds the antenna pattern 306 to interact with the antenna element 308 and improve the overall antenna 134 performance without increasing computing device volume.

Figure 6:
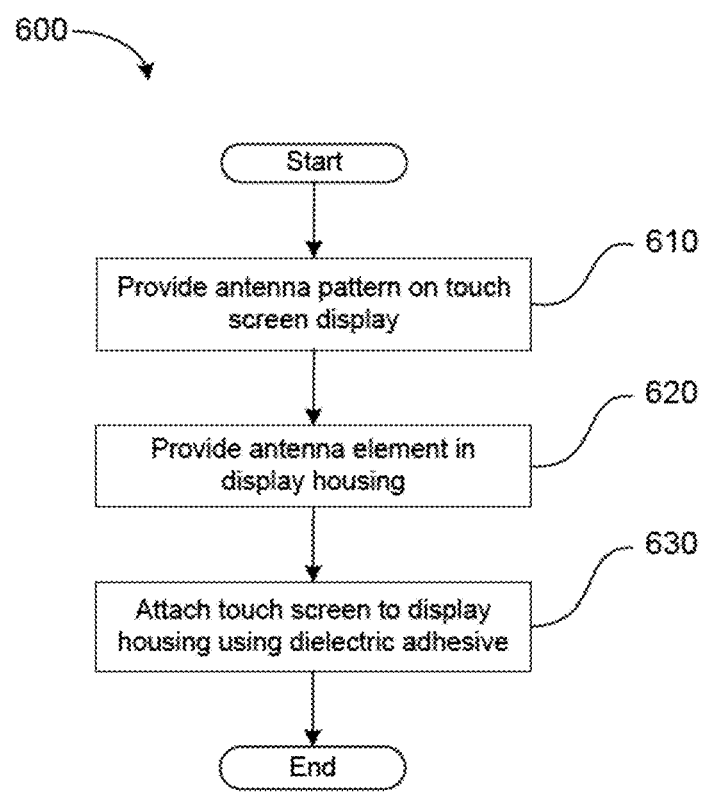
FIG. 6 illustrates a method for providing a capacitively coupled antenna in a computing device.

FIG. 6 illustrates a method 600 for providing a capacitively coupled antenna in a computing device. The method begins by providing an antenna pattern on a back side of a touch screen display (block 610). Well-known masking/sputtering/etching techniques may be employed to provide the antenna pattern on the touch screen. In one example, indium tin oxide is sputtered and etched to provide the antenna pattern. The antenna pattern may take any variety of shapes. As shown in FIGS. 3 and 4, the antenna pattern may be a rectangular shape provided proximate edges of the touch screen.

An antenna element is provided in a display housing (block 620). The antenna element may be encased in an antenna carrier within the display housing. The antenna carrier may shield the antenna element from other components of the computing device. The antenna element is commonly provided in computing devices that are configured to wirelessly communicate with a network. The shape of the antenna element matches the shape of the antenna pattern such that when the touch screen is attached to the display housing, the antenna pattern is substantially aligned with the antenna element.

The touch screen is attached to the display housing a dielectric adhesive (block 630). The dielectric adhesive is provided between the antenna pattern and the antenna element and prevents the antenna pattern from contacting the antenna element. The combination of the antenna pattern, dielectric adhesive and the antenna element provide a capacitively coupled antenna in the computing device. By utilizing the existing antenna element, the performance of the antenna of the computing device can be enhanced by the mere addition of the antenna pattern. Accordingly, reduced computing device size is promoted without sacrificing wireless communication capability.

Although the disclosure herein has been described with reference to particular implementations, it is to be understood that these implementations are merely illustrative of the principles and applications of the disclosure. It is therefore to be understood that numerous modifications may be made to the illustrative implementations and that other arrangements may be devised without departing from the spirit and scope as defined by the appended claims.

The invention claimed is:

1. A computing device comprising:
   a touch screen display having an antenna pattern provided on a surface thereof;
   a display housing having an antenna element provided therein; and
   a single dielectric adhesive located between the touch screen display and the display housing, as well as between the antenna pattern and the antenna element,
   wherein the touch screen display is attached to the display housing using the dielectric adhesive, and wherein the dielectric adhesive prevents the antenna pattern from contacting the antenna element such that the antenna pattern is capacitively coupled to the antenna element.

2. The computing device of claim 1, wherein a thickness of the dielectric adhesive between the antenna pattern and the antenna element is less than 0.1 millimeters.

3. The computing device of claim 1, wherein a shape of the antenna pattern matches a shape of the antenna element.

4. The computing device of claim 1, further comprising an antenna carrier, wherein the antenna element is provided in the antenna carrier, the antenna carrier being configured to shield the antenna element from interference with other computing device components.

5. The computing device of claim 1, wherein the display housing comprises a metal material.

6. The computing device of claim 1, wherein the antenna pattern comprises indium tin oxide.

7. The computing device of claim 1, wherein the antenna pattern is substantially rectangular and is provided proximate to edges of the touch screen display.

8. A computing device comprising:
   a base portion; and
   a display portion attached to the base portion, the display portion comprising:
      a touch screen display having an antenna pattern provided on a surface thereof,
      a display housing having an antenna element provided therein, and
      a single dielectric adhesive located between the touch screen display and the display housing, as well as between the antenna pattern and the antenna element,
      wherein the touch screen display is attached to the display housing the dielectric adhesive, and wherein the dielectric adhesive prevents the antenna pattern from contacting the antenna element such that the antenna pattern is capacitively coupled to the antenna element.

9. The computing device of claim 8, wherein a thickness of the dielectric adhesive between the antenna pattern and the antenna element is less than 0.1 millimeters.

10. The computing device of claim 8, wherein a shape of the antenna pattern matches a shape of the antenna element.

11. The computing device of claim 8, further comprising an antenna carrier, wherein the antenna element is provided in the antenna carrier, the antenna carrier being configured to shield the antenna element from interference with other computing device components.

12. The computing device of claim 8, wherein the display housing comprises a metal material.

13. The computing device of claim 8, wherein the antenna pattern comprises indium tin oxide.

14. The computing device of claim 8, wherein the antenna pattern is substantially rectangular and is provided proximate to edges of the touch screen display.

15. A method comprising:
   providing an antenna pattern on a surface of a touch screen display;
   providing an antenna element in a display housing;
   providing a single dielectric adhesive between the touch screen display and the display housing, as well as between the antenna pattern and the antenna element; and
   attaching the touch screen display to the display housing the dielectric adhesive,
   wherein the dielectric adhesive prevents the antenna pattern from contacting the antenna element such that the antenna pattern is capacitively coupled to the antenna element.

16. The method of claim 15, wherein a thickness of the dielectric adhesive between the antenna pattern and the antenna element is less than 0.1 millimeters.

17. The method of claim 15, wherein a shape of the antenna pattern matches a shape of the antenna element.

18. The method of claim 15, further comprising providing an antenna carrier in the display housing, herein the antenna element is provided in the antenna carrier, the antenna carrier being configured to shield the antenna element from interference with other components in the display housing.

19. The method of claim 15, wherein providing the antenna pattern comprises patterning the antenna pattern on a back surface of the touch screen display using masking, sputtering and etching techniques.

20. The method of claim 15, wherein the antenna pattern comprises indium tin oxide.

21. The method of claim 15, wherein providing the antenna pattern comprises providing the antenna pattern proximate to edges of the touch screen display.

* * * * *